(12) United States Patent
Aikens

(10) Patent No.: US 7,275,669 B1
(45) Date of Patent: Oct. 2, 2007

(54) BICYCLE MOUNTED BALL CARRIER DEVICE

(76) Inventor: Isaac Aikens, 2302 Overpass Rd., Campbellton, FL (US) 32426

(*) Notice: Subject to any disclaimer, the term of this patent is extended or adjusted under 35 U.S.C. 154(b) by 535 days.

(21) Appl. No.: 10/787,523

(22) Filed: Feb. 26, 2004

(51) Int. Cl.
B62J 7/06 (2006.01)

(52) U.S. Cl. ............. 224/420; 224/919; 224/463; 224/572; 206/315.9

(58) Field of Classification Search ........... 224/420, 224/919, 419, 436, 437, 463, 572, 250; 206/315.9, 206/315.91
See application file for complete search history.

(56) References Cited

U.S. PATENT DOCUMENTS

| 599,119 | A | * | 2/1898 | Coolidge | 224/438 |
|---|---|---|---|---|---|
| 610,251 | A | * | 9/1898 | Wall | 224/432 |
| 752,004 | A | * | 2/1904 | Simons | 224/436 |
| 4,244,497 | A | | 1/1981 | Lee | 224/36 |
| 4,510,982 | A | | 4/1985 | Sangroni | 150/52 A |
| 4,900,204 | A | * | 2/1990 | Summers | 410/97 |
| 5,085,320 | A | | 2/1992 | Scott | 206/315.9 |
| 5,340,004 | A | * | 8/1994 | Moore | 224/563 |
| D410,335 | S | * | 6/1999 | Raich | D3/315 |
| 6,095,390 | A | | 8/2000 | Bogle | 224/664 |
| 6,193,293 | B1 | * | 2/2001 | Ybanez | 294/152 |
| 6,550,654 | B1 | * | 4/2003 | Crago | 224/275 |

* cited by examiner

Primary Examiner—Nathan J. Newhouse
Assistant Examiner—Margaret Olson
(74) Attorney, Agent, or Firm—Sturm & Fix LLP

(57) ABSTRACT

A ball carrier device (10) adapted to be suspended from the handle bars (101) of a bicycle (100) wherein, the carrier device (10) includes a main closed loop strap member (20) having an enlarged central loop (21) flanked by a pair of discrete auxiliary loops (22) (23) and a plurality of sling strap members (30) (31) (32) having opposite ends connected to the enlarged central loop portion of the main strap member (20) to form an open cradle dimensioned to receive a sports ball (200) wherein, the auxiliary loops (22) (23) are dimensioned to be slipped over the opposite ends of the bicycle handle bars (101).

5 Claims, 2 Drawing Sheets

BICYCLE MOUNTED BALL CARRIER DEVICE

CROSS REFERENCE TO RELATED APPLICATIONS

This invention was the subject matter of Document Disclosure Program Registration Number 540,886, filed in the United States Patent and Trademark Office on Oct. 28, 2003.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of ball carrying devices in general and in particular to a ball carrying device that is specifically designed to be attached to the handle bars of a bicycle.

2. Description of Related Art

As can be seen by reference to the following U.S. Pat. Nos. 6,095,390; 5,085,320; 4,244,497; and 4,510,982, the prior art is replete with myriad and diverse ball transporting devices.

While all of the aforementioned prior art constructions are more than adequate for the basic purpose and function for which they have been specifically designed, they are uniformly deficient with respect to their failure to provide a simple, efficient, and practical ball carrying device for bicycles that may be quickly and easily attached and detached to and from a bicycle for the purpose of transporting a soccer ball, basketball, or football to and from a sports venue.

As a consequence of the foregoing situation, there has existed a longstanding need for a new and improved ball carrying device for bicycles which forms a resilient sling for a ball that is equally adaptable for manual transport, and the provision of such a construction is a stated objective of the present invention.

BRIEF SUMMARY OF THE INVENTION

Briefly stated, the bicycle mounted ball carrying device that forms the basis of the present invention comprises in general a plurality of flexible strap members connected to one another in a specific relationship to form an open sling pouch for the ball that is adapted to be suspended from the handle bar of a wheeled vehicle such as a bicycle, tricycle, ATV., etc.

As will be explained in greater detail further on in the specification, the carrier unit includes a main closed loop strap member that includes an enlarged central loop opening and a pair of opposed discrete loop openings wherein, the enlarged loop opening is dimensioned to receive a sports ball and the auxiliary discrete loop openings are adapted to be slipped over the opposite ends of a vehicle's handle bar.

In addition, the carrier unit further comprises a plurality of sling strap members that are suspended from opposed sides of the enlarged central loop opening wherein, the midpoints of the sling strap members are connected together to form a cradle for the sports ball.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
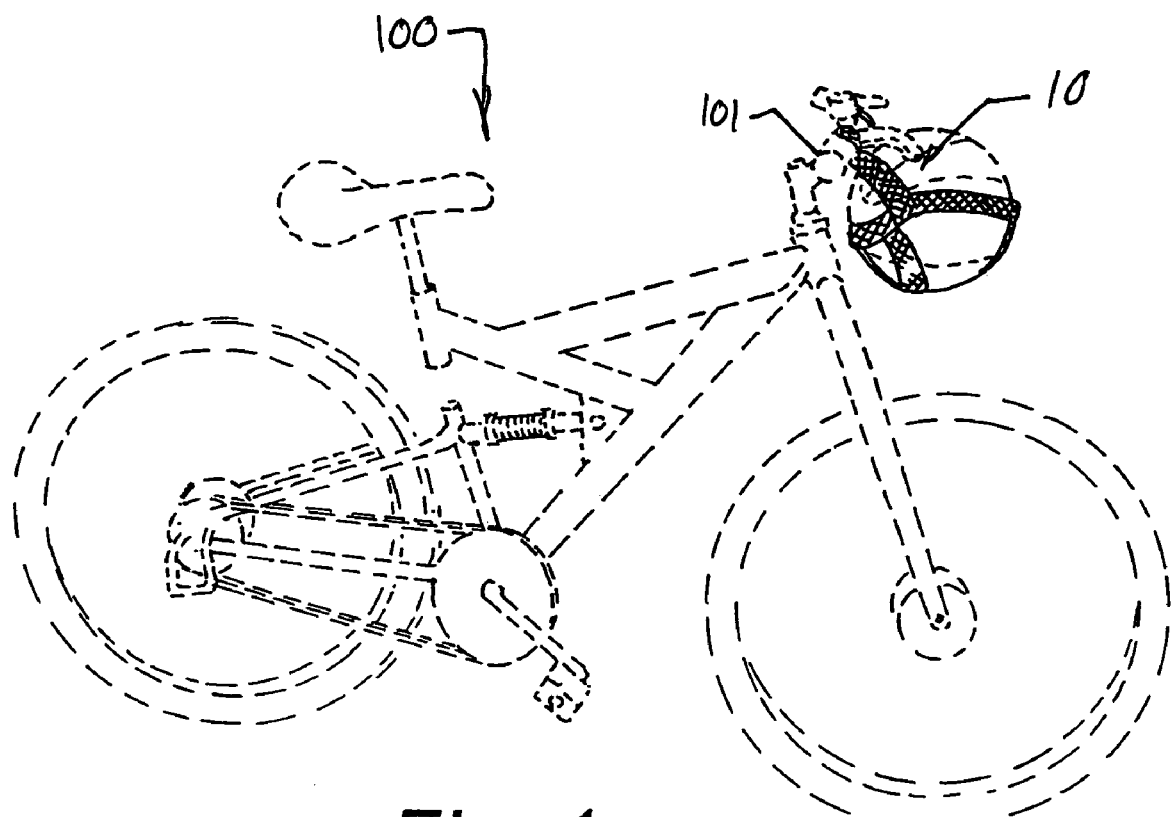
FIG. 1 is a perspective view of the ball carrier device mounted on a bicycle.
Figure 2:
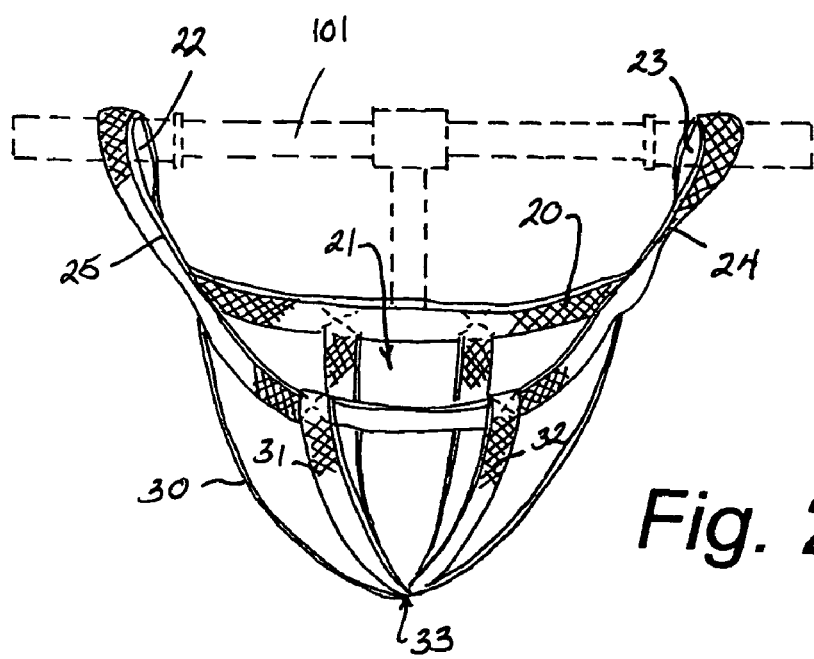
FIG. 2 is a front perspective view of the empty carrier device suspended from the handle bar of a bicycle.

As can be seen by reference to the drawings, and in particularly to FIG. 1, the ball carrier device that forms the basis of the present invention is designated generally by the reference number 10. As shown in FIG. 2, the carrier device 10 comprises a main closed loop strap member 20 having an enlarged central opening 21 flanked by a pair of discrete auxiliary openings 22 23 wherein, the loop openings 21 22 and 23 are formed by joining opposed surfaces of the main strap member 20 together as at 24 25 by stitching, adhesives, heat welding or the like.

Figure 3:
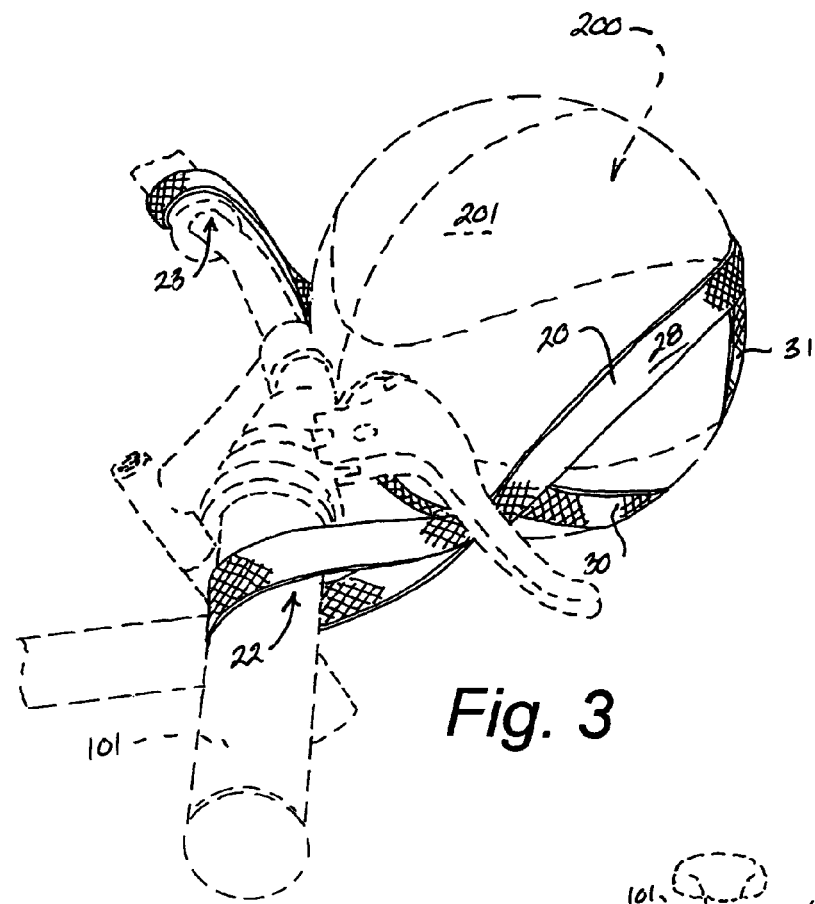
FIG. 3 is a side perspective view of the carrier device supporting a ball relative to the handle bar.
Figure 4:
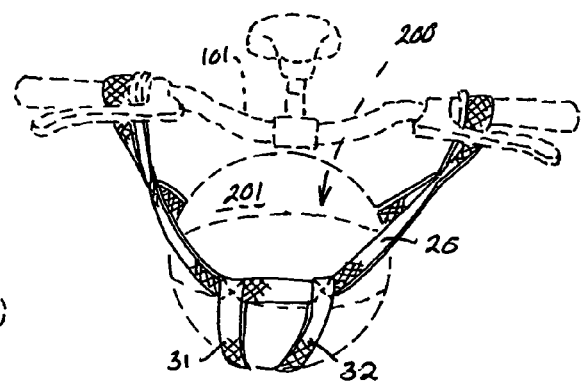
FIG. 4 shows a basketball or soccer ball suspended within the carrier device; and, FIG. 5 shows a football suspended within the carrier device.
Figure 5:
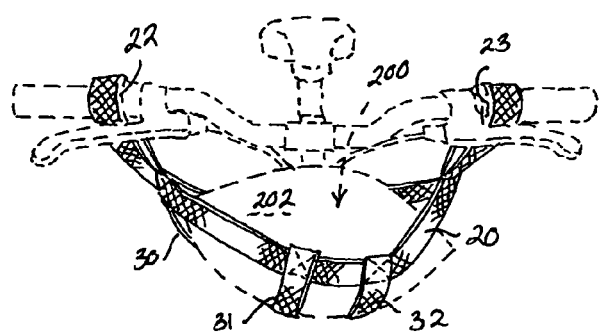

As can also be seen by references to FIG. 2, the carrier device 10 also includes a plurality of elongated sling strap members 30 31 and 32 which are connected together at their midpoints 33 and wherein, the opposed ends of the sling strap members 30 31 and 32 are fixedly connected to diametrically opposed spaced surfaces on the central opening portion of the main strap member 20 to form an open cradle for the lower portion of a sports ball 200 such as a football 202 or basketball/soccer ball 201 as depicted in FIGS. 3 and 5.

As can also be appreciated by reference to FIGS. 1 through 5, the main strap member 20 is dimensioned such that the auxiliary discrete loop openings 22 23 can be slipped over the opposite ends of the handle bar 101 of a bicycle 100 in a well recognized fashion.

Furthermore, in the preferred embodiment of the invention depicted in FIG. 3, the strap members 20 30 31 and 32 are fabricated from flexible, resilient material 28 that will support and frictionally engage the periphery of a ball 200 in a well recognized fashion.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

The invention claimed is:

1. A ball carrier device for use with a wheeled vehicle having handle bars, wherein the carrier device comprises:
   a main strap member having opposed surfaces joined together to form an enlarged central loop and to form a pair of opposed auxiliary loops, wherein the auxiliary loops extend from diametrically opposed spaced surfaces of the central loop, and are disposed to be slipped over opposite ends of the handle bars of the wheeled vehicle; and
   a plurality of sling strap members each having opposed ends connected to diametrically opposed surfaces on the central loop portion of the main strap member, wherein all of the sling strap members intersect each other and are connected to one another proximate their respective midpoints; wherein, all of the sling strap members intersect each other and are connected to one another proximate their respective midpoints.

2. The ball carrier device as in claim 1, wherein said plurality of sling strap members comprise at least three sling strap members.

3. The ball carrier device as in claim 1, wherein all of said strap members are fabricated from flexible material.

4. The ball carrier device as in claim 1, wherein all of said strap members are fabricated from resilient material.

5. The ball carrier device as in claim 1, wherein all of said strap member are fabricated from flexible and resilient material.

* * * * *